Sept. 25, 1956 E. K. HOWELL 2,764,681

FREQUENCY STABILIZED AND CONTROLLED OSCILLATORY SYSTEM

Filed Aug. 19, 1953

Inventor:
Edward Keith Howell,
by Donald N. Timbie
His Attorney.

United States Patent Office 2,764,681
Patented Sept. 25, 1956

2,764,681

FREQUENCY STABILIZED AND CONTROLLED OSCILLATORY SYSTEM

Edward Keith Howell, North Syracuse, N. Y., assignor to General Electric Company, a corporation of New York Application August 19, 1953, Serial No. 375,174

5 Claims. (Cl. 250—36)

This invention relates to a stabilized oscillatory system that has automatic frequency control, and to a multivibrator of general utility that is particularly useful in the system.

Automatic-frequency-controlled oscillatory systems have generally included a sine wave oscillator, a reactance tube to control the frequency of the oscillator and a discriminator. A reference wave, derived either from the output of the oscillator or from the utilization means coupled to the oscillator, and a synchronizing signal or pulse are applied to the discriminator and the control voltage derived by the discriminator is applied to the reactance tube. Although this type of system has operated successfully, it is rather expensive for several reasons, among them being the necessity for an expensive reactance tube. Furthermore, in some applications the utilization means may not operate well in response to a sine wave, so that additoinal means must be used to develop a suitable control wave.

There are many reasons that make the use of an oscillator in the form of a multivibrator desirable, among them being the fact that its frequency can be controlled by direct application of a control voltage so that a reactance tube or the equivalent is not required and the fact that the square wave output is more easily adapted for use with certain utilization means.

However, multivibrators per se do not ordinarily have sufficient stability to maintain their natural frequency within the lock-in range required for most applications. The commonly-accepted method for increasing the stability of a multivibrator has been to connect a parallel-tuned LC circuit in series with the plate load resistor of one of the two tubes. This method has generally been termed A. C. stabilization. The tuned circuit adds a sine wave to the exponential discharge voltage applied by the coupling capacitor to the grid of the other tube so as to tend to stabilize the frequency of the multivibrator. The degree of stabilization obtained in this manner is a function of the relative amplitudes of the resistance of the plate load resistor and the impedance of the tuned circuit. As the amount of stabilization is increased, it becomes more and more difficult to control the frequency of the multivibrator with a control voltage. In other words the frequency becomes more and more dependent on the sine wave provided by the tuned circuit and less and less responsive to the control voltage. It is important that the frequency be sensitive to the control voltage as it not only contains information derived from frequency drift of the multivibrator but also information as to frequency drift of the reference wave to which the multivibrator should be locked.

It is accordingly an object of the invention to provide means for stabilizing the frequency of a multivibrator without reducing the sensitivity of its response to variations of a frequency control voltage.

It is another object of the invention to provide an improved frequency stabilized multivibrator.

Practical experience has shown that it is difficult to make proper adjustments of an A. C. stabilized multivibrator in production. Improper adjustment results in asymmetrical operation, improper loop gain and possibly in erratic frequency division. The presence of any of these faults in most applications is normally intolerable.

Accordingly, it is another object of this invention to provide an improved frequency stabilized multivibrator that can be easily adjusted for proper operation.

It is a further object of this invention to provide an improved oscillatory system, the frequency of which is controlled in accordance with a control voltage that represents the deviation of the frequency of the system from the repetition frequency of a synchronizing wave.

The frequency of multivibrators is extremely sensitive to variations in the voltage of the power supply that provides the operating potentials. Accordingly, it is still another object of this invention to provide a multivibrator having a relatively stable frequency in the presence of variations in the voltage provided by the power supply.

Briefly, these objects, as well as other objects and advantages may be attained in the following manner: Variations in operating potential, tube characteristics and the values of some circuit components produce variations in the gain of a two-tube multivibrator and change its operating frequency. The amount of the average negative voltage appearing at the grid of the second tube of the multivibrator is directly proportional to the gain. Means are provided for feeding back the negative voltage to an electrode of the first tube of the multivibrator so as to control its gain by an amount that is inversely proportional to the change in the amplitude of negative voltage. In this way the over-all gain of the multivibrator is maintained constant, so that its oscillation frequency remains constant. Such a multivibrator can be incorporated in a frequency-controlled oscillatory system by combining the negative voltage appearing at the grid of the second tube with a control voltage and applying the resultant voltage to the grid of the first tube. The portion of the resultant voltage that is derived from the second grid compensates for variations in frequency arising from changes in gain of the multivibrator and thus, for any given value of the control voltage, the multivibrator always operates at the same frequency.

Further objects and advantages of this invention will become apparent and the invention will be more clearly understood from the following description, referring to the accompanying drawings in which.

Figure 3:
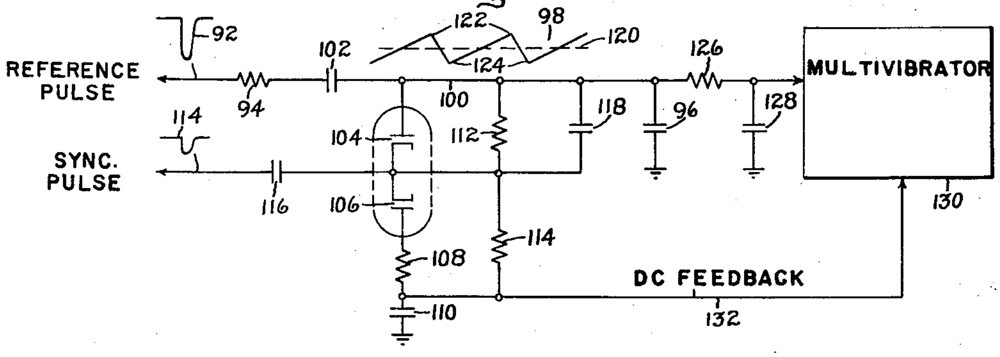
Figure 3A:
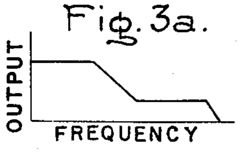

Figure 3 shows one way of combining the D. C. stabilizing voltage of the multivibrator with the A. F. C. voltage provided by a discriminator; and Figure 3A illustrates the desired frequency response characteristic of an A. F. C. system.

Figure 1:
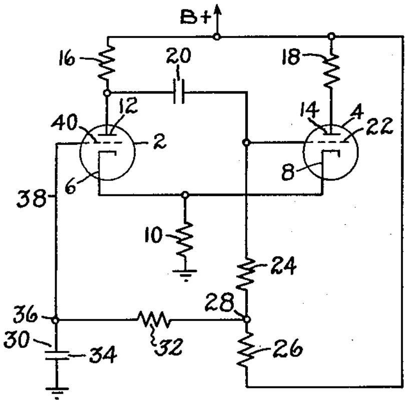
Figure 1 is a schematic illustration of a multivibrator that is D. C.-stabilized in accordance with the principles of this invention.

The D. C. stablized multivibrator of Figure 1 is comprised of two electron discharge devices 2 and 4 that for purposes of illustration are shown as being vacuum triodes. Their respective cathodes 6 and 8 are coupled together and are connected to ground via a common cathode resistor 10. Their respective plates 12 and 14 are separately connected to a source of B+ operating potential (not shown) via plate load resistors 16 and 18. A coupling condenser 20 is connected between the plate 12 of the electron discharge device 2 and a grid 22 of the electron discharge device 4. The grid 22 is returned to B+ via series-connected resistors 24 and 26.

For reasons well known to those skilled in the art, the average D. C. potential of the grid 22 is negative with respect to ground so that a suitable choice of the relative values of the resistors 24 and 26 causes the average D. C. potential of the junction 28 between the resistors to be at ground potential. Any variations in the potential of the junction that occur during a cycle of operation of the multivibrator are removed by a suitable low pass filter 30, which in this particular embodiment of the invention is illustrated as being comprised of a resistor 32 and condenser 34 connected in series between the junction 28 and ground. The output of the low pass filter 30, which in this particular example may be obtained at the junction 36, is applied via a lead 38 to the grid 40 of the electron discharge device 2.

The multivibrator operates as follows to correct for any variations in gain that may result from changes in the value of the B+ potential, changes in tube characteristics or the aging of the various circuit components. If, for example the gain of the electron discharge device 2 decreases, the amplitude of the variations in potential appearing at its plate, as the tube goes from a nonconducting to a conducting condition and vice versa, are reduced. This in turn causes the condenser 20 to charge and discharge less so that the average D. C. potential at the grid 22 is more positive. Hence, the voltage at the junction 28, which was originally at ground potential becomes positive. The condenser 34 charges to a positive potential so as to raise the potential of the grid 40 and restore the gain of the tube or electron discharge device 2. The D. C. voltage fed back in this manner to the grid 40 then acts as a degenerative feed-back for those low frequencies that pass through the low pass filter 30. Inasmuch as the variations in gain caused by the factors noted above are of low frequency, the D. C. feed-back circuit compensates for them.

Figure 2:
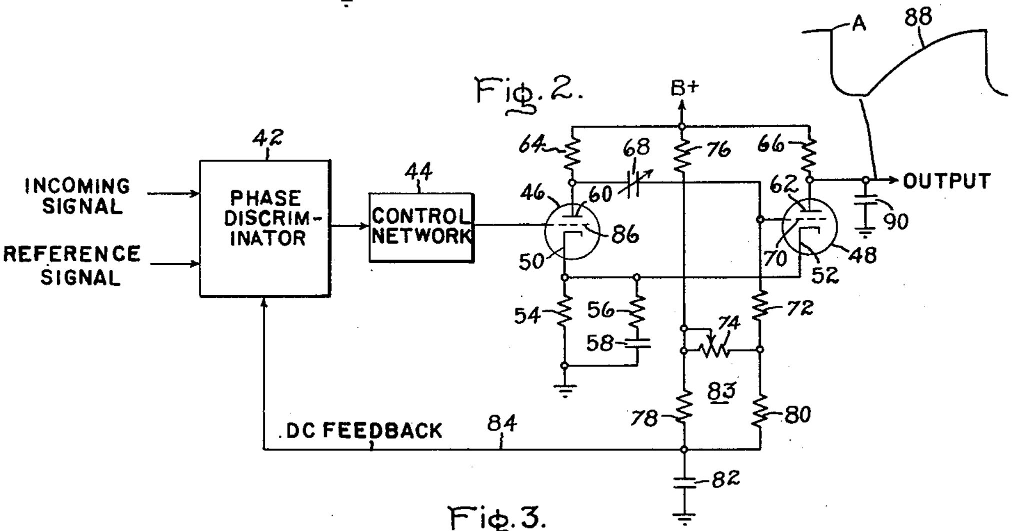
Figure 2 illustrates a slightly different way of stabilizing a multivibrator in accordance with the principles of this invention as well as a way of using a multivibrator in an automatic frequency control system.

Figure 2 shows a way of incorporating a multivibrator constructed in accordance with the principles of this invention in an oscillatory system having its frequency controlled by a synchronizing wave. In this example, the system is used for developing sawtooth waves of voltage for a cathode ray beam deflection in a television receiver. However, it is to be understood that the multivibrator can also be used in other types of automatic frequency controlled oscillatory systems.

A reference signal indicative of the frequency of beam deflection, such as a flyback pulse obtained from the deflection yoke, is applied to a frequency discriminator 42 where its frequency is compared with the frequency of a synchronizing signal to which the oscillatory system is to be synchronized. The synchronizing signal is usually in the form of uniformly spaced pulses that cause the discriminator to produce output pulses having an amplitude dependent on the amplitude of the signal derived from the deflection system at the time the synchronizing pulse occurs. An integrating control network 44 is coupled to the output of the discriminator 42 so as to smooth out the control pulses provided by it and form a smooth voltage wave that may be used for controlling the frequency of the multivibrator. The multivibrator is similar to that shown in Figure 1 and is comprised of triodes 46 and 48. The cathodes 50 and 52 are coupled together by a common cathode resistor 54 that is connected between each of the cathodes and ground. For reasons that will be apparent as the description proceeds, a series circuit comprised of a resistor 56 and a condenser 58 is connected in shunt with the cathode-coupling resistor 54. The plates 60 and 62 of the triodes 46 and 48 are separately connected to a point of B+ potential by plate load resistors 64 and 66. A variable condenser 68 is connected between the plate 60 and the grid 70 of the triode 48. The grid 70 is returned to B+ via a resistor 72, a variable resistor 74 and a resistor 76. Series resistors 78 and 80 are connected in shunt with the variable resistor 74 and a condenser 82 is connected between their junction and ground. As will be explained, a frequency-stabilizing D. C. feed-back voltage is developed across the condenser 82 and is coupled via a lead 84 to the discriminator 42 in such manner as to add to the pulses supplied by the discriminator. Hence the voltage appearing at the output of the control network 44 is the sum of the D. C. feed-back voltage and the frequency control voltage derived by the discriminator. This combined voltage is applied to the grid 86 of the tube 46 so as to control its gain and hence control the frequency of the multivibrator. A sawtooth voltage wave 88, suitable for application to the beam deflection system, may be developed by connecting a condenser 90 between the plate 62 of the tube 48 and ground.

The operation of the oscillatory system just described is as follows: As is well known, the frequency of the multivibrator is largely determined by the RC time constant of the variable condenser 68 and the resistance in series with it. Therefore, the condenser 68 may be adjusted in the factory so as to set the frequency of the multivibrator at a desired value. The variable resistor 74 serves in the following way as a deflection frequency hold control that can be made available to the operator of the receiver. For reasons well known to those skilled in the art, the average D. C. potential of the grid 70 is negative with respect to ground so that with a suitable value of the B+ voltage and suitable values of the resistors 72 and 76, a point of ground potential may occur at some point in the operative section of the variable resistor 74. The resistors 78 and 80 and the condenser 82 form a low pass filter 83 so that the voltage across the condenser 82 is proportional to the average D. C. potential of the grid 70. If the gain of the multivibrator should vary so much that the required amount of D. C. feed-back voltage is not developed, the value of the variable resistor can be altered so as to obtain it. However, such an adjustment is seldom necessary.

During the time when the oscillatory system is locking in with the synchronizing signal, the control voltage supplied by the discriminator 42 contains transients that are generally of such high frequency as not to pass through the low pass filter 83. Hence these frequencies are not degenerated and the maximum sensitivity of control is maintained. After the system has been locked in, the frequency of the control voltage is generally low enough to pass the low pass filter 83 so that these frequencies are degenerated. As a result the sensitivity of control over the frequency of the system is reduced but for such low frequency variations it is not needed.

It might at first appear that the portion of the control voltage that is derived from the frequency discriminator 42 might be degenerated by the degenerative feed-back circuit. However, the frequency of this portion of the control voltage is generally too high to pass through the low pass filter in the degenerative D. C. feed-back loop.

The portion of the sawtooth wave 88 with the lower slope is developed as the condenser 90 charges toward B+ during the portion of the operative cycle when the tube 48 is not conducting. The portion of the wave having the steeper slope is formed when the condenser 90 discharges through the common cathode impedance comprised of the resistors 54 and 56 and the condenser 58, and through the tube 48. The presence of the condenser 58 increases the discharge rate of the condenser 90 because its impedance is so low as to effectively short-circuit the cathode resistor 54 which otherwise would introduce considerable resistance in the discharge path. The discharge rate is lowered somewhat by the small charge on the condenser 58 that is of a polarity opposite to that on the condenser 90. However, the resistor 56, small though it may be, reduces the voltage across the condenser 58 and thereby aids in steepening the downward slope of the sawtooth wave 88.

Although there are many type of discriminators that may be used, Figure 3 illustrates how one commonly-used type may be combined with a multivibrator of the type previously described so as to form a synchronized oscillatory system.

In Figure 3 negative reference pulses 92, provided by a source not shown, are integrated by a resistor 94 and a condenser 96 so as to produce a sawtooth voltage wave 98 on the lead 100. A decoupling condenser 102 is provided to isolate the diodes from the effects of any D. C. voltage that may be present in the source of the pulses as well as to isolate the diodes from the loading caused by the resistor 94. Diodes 104 and 106 are connected cathode-to-cathode in series with a resistor 108 and a bypass condenser 110. Circuit considerations may require the capacitance of the condenser 96 to be less than the capacitance of the condenser 110. This causes the efficiency of the diode 104 to be greater than the efficiency of the diode 106. The resistor 108 reduces the efficiency of the diode 106 to a point where it is the same as the efficiency of the diode 104. The series circuit thus formed is connected between the lead 100 and ground. Equal valued resistors 112 and 114 are connected as shown so as to apply the sawtooth wave 98 across each diode at half amplitude. Synchronizing pulses 114 are coupled from a source, not shown, to the cathodes of the diodes via a condenser 116. As the condenser 116 is effectively coupled in parallel with the diode 106 by the source of the synchronizing pulses 114, it affects the impedance including the resistor 114 across which the half-amplitude sawtooth waves are to appear. In order to make the impedance across the other diode 104 the same as the impedance across the diode 106, a condenser 118 is connected in parallel with the resistor 112. This causes sawtooth waves of the same phase and amplitude to be applied across each diode.

The double diode discriminator circuit just described operates in the following manner to produce, during each of the synchronizing pulses, a pulse having an amplitude and polarity depending on the relative times of occurrence of the synchronizing pulses 114 and reference pulse 92 and the sawtooth wave 98 derived from it. Due to the presence of the condenser 102, the sawtooth wave 98 oscillates about its A. C. axis, the A. C. axis having the same potential as exists at the top of the condenser 110. As the condenser 110 is large enough to short-circuit the frequencies contained in the sawtooth wave 98, the top of the condenser is at ground potential and the A. C. axis 120 of the sawtooth wave is also at ground potential. During the portion 122 of the sawtooth wave 98 that is positive the upper diode 104 conducts so as to place a negative charge on the top plate of the condenser 96. During the negative portions 124 of the sawtooth wave 98 the lower diode 106 conducts and the diode 109 is cut off. This action discharges the charge previously built up in the condenser 96 and at the same time charges the condenser 96 to an equal and opposite polarity. Therefore, the average charge on the condenser 96 is zero. This will only occur if the efficiencies of the diodes and the impedances in shunt with the diodes are balanced.

When the synchronizing pulses 114 occur as the sawtooth wave 98 is crossing its A. C. axis 120, the diodes conduct equal amounts of current so that the average charge on the condenser 96 is zero. However, if the phase relationship between the sawtooth wave 98 and the synchronizing pulses 114 shifts, one or the other of the diodes conducts more current. This causes a net average positive or negative charge or voltage to be placed in the condenser 96 that can be used to control the frequency of an oscillatory system. As the voltage across the condenser 96 has sawtooth wave and synchronizing pulse components, a smoothing filter or control network comprised, in this instance, of a resistor 126 and a condenser 128 is provided. The smooth control voltage is then applied to the grid of one of the amplifiers in a multivibrator 130 as set forth in Figure 2.

In accordance with this invention, a D. C. feed-back lead 132 corresponding to the lead 84 of Figure 2 is connected to the junction of the condenser 110 and the resistor 108. In this way the gain correction voltage present on the lead is superimposed onto the frequency control voltage derived by the discriminator action just described. Since the condenser 110 is of sufficient size to effectively short-circuit the sawtooth wave components, it presents a substantial amount of impedance to the low frequency gain control voltage on the lead 132.

Consideration of the effects of noise leads, for reasons that need not be disclosed, to a frequency control system having a frequency response characteristic such as illustrated in Figure 3A. In other frequency-controlled oscillatory systems such a characteristic is obtained by using a more complex smoothing filter than that formed by the resistor 126 and the condenser 128. However, such a characteristic is obtained in this invention by using an appropriate form of the low pass filter in the D. C. feed-back loop.

In the particular arrangements described, the D. C. feed-back loop has been coupled to the output of the discriminator in such manner that the discriminator output is combined with the frequency stabilizing voltage on the feed-back lead. These combined voltages were then passed through a smoothing filter or control network before being applied to the grid of the first amplifier of the multivibrator. Actually, the voltage on the D. C. feed-back lead is smoothed by the low pass filter to such an extent that it need not be further smoothed by the control network. Accordingly, it should be understood that the voltage on the D. C. feed-back lead can be combined with the output of the control network.

While I have illustrated a particular embodiment of my invention, it will of course be understood that I do not wish to be limited thereto since various modifications, both in the circuit arrangement and in the instrumentalities, may be made, and I contemplate by the appended claims to cover any such modifications as fall within the true spirit and scope of the invention.

What I claim as new and desire to secure by Letters Patent of the United States is:

1. A frequency stabilized multivibrator comprising, in combination, a first electron discharge device having a plate, a grid and a cathode, a second electron discharge device having a plate, a grid, and a cathode, a source of positive potential, a separate plate load impedance connected between the plate of each of said electron discharge devices and said source of positive potential, a source of relatively negative potential, a cathode impedance connected betwen each of said cathodes to said source of negative potential, a first condenser coupled between the plate of said first electron discharge device and the grid of said second electron discharge device, a resistive impedance connected between the grid of said second electron discharge device and said source of positive potential, and a low pass filter connected between the grid of said second electron discharge device and the grid of said first electron discharge device such that a change of potential occurring at the grid of said second electron discharge device is communicated to the grid of said first electron discharge device via said low-pass filter, said filter being constructed to prevent passage of frequencies above the frequency of said multivibrator from the grid of said second electron discharge device to the grid of said first electron discharge device.

2. A multivibrator as set forth in claim 1, wherein said low pass filter is effectively connected between an intermediate point on said resistive impedance and the grid of said first electron discharge device.

3. A frequency stabilized multivibrator comprising, in combination, a first amplifier and a second amplifier, each of said amplifiers having at least a plate, a grid and a cathode, means for coupling the plate of the first amplifier to the grid of the second amplifier, means for coupling the cathodes of the amplifiers together, and a low pass filter coupled between the grid of the second amplifier and the grid of the first amplifier such that a change of potential occurring at the grid of said second electron discharge device is communicated to the grid of said first electron discharge device via said low-pass filter, said filter being constructed to prevent passage of frequencies above the frequency of said multivibrator from the grid of said second electron discharge device to the grid of said first electron discharge device.

4. A frequency synchronized oscillatory system comprising, in combination, a multivibrator having first and second amplifiers, each of said amplifiers having at least a grid, a plate and a cathode, means for coupling the plate of said first amplifier to the grid of said second amplifier, means for coupling said cathodes together, a low pass filter coupled to the grid of said second amplifier, a phase discriminator having a first input adapted to receive signals indicative of the phase of the oscillations provided by said multivibrator and a second input adapted to receive synchronizing signals, means for combining the output of said discriminator and said low pass filter, and means for applying the output of said combining means to the grid of said first amplifier.

5. A frequency stabilized multivibrator comprising, in combination, a first amplifier and a second amplifier, each of said amplifiers having a cathode, grid and plate, a first terminal adapted to have a positive potential applied thereto, separate plate load impedances connected between each of said plates and said first terminal, a second terminal adapted to receive a potential that is more negative than the potential applied to said first terminal, a common cathode impedance connected between said cathodes and said second terminal, a first condenser coupled between the plate of said first amplifier and the grid of said second amplifier, an impedance connected between the grid of said second amplifier and the grid of said first amplifier, and a second condenser connected between the grid of said first amplifier and said second terminal, said latter impedance and said second condenser forming a low pass filter such that a change of potential occurring at the grid of said second electron discharge device is communicated to the grid of said first electron discharge device via said low-pass filter, said filter being constructed to prevent passage of frequencies above the frequency of said multivibrator from the grid of said second electron discharge device to the grid of said first electron discharge device.

References Cited in the file of this patent

UNITED STATES PATENTS

| | | |
|---|---|---|
| 2,248,975 | Faudell | July 15, 1941 |
| 2,338,395 | Bartelink | Jan. 4, 1944 |
| 2,573,354 | Poch | Oct. 30, 1951 |
| 2,620,455 | Fockler | Dec. 2, 1952 |